Feb. 14, 1961 — W. S. CAHILL — 2,971,247
DISC RASP
Filed July 15, 1959 — 2 Sheets-Sheet 1
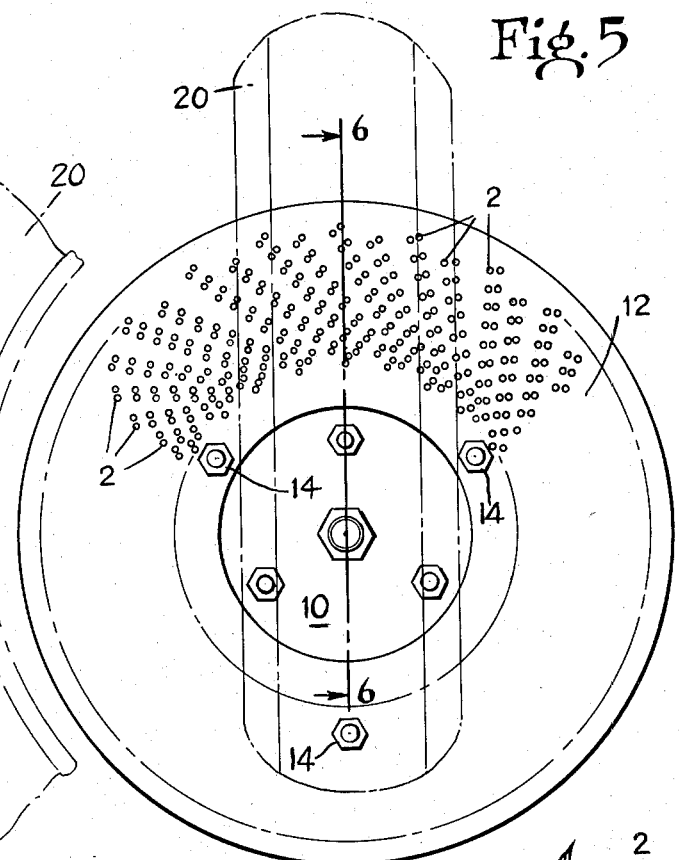
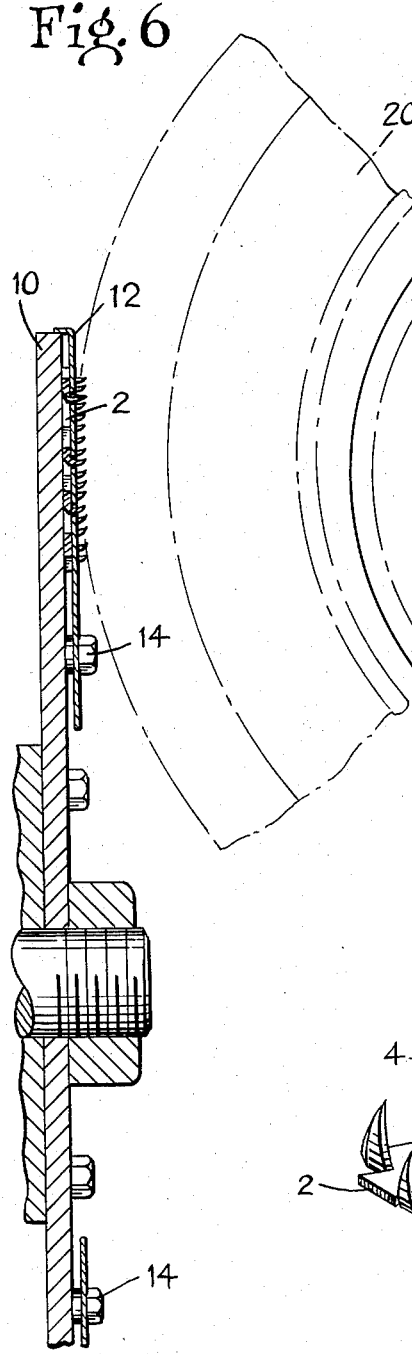
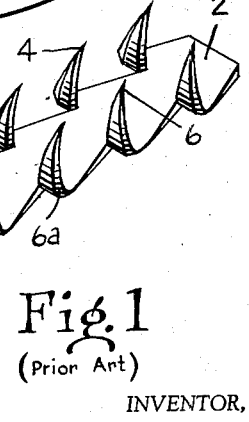
Fig. 1 (Prior Art)
INVENTOR,
William S. Cahill,
BY Bailey, Stephens & Huettig
ATTORNEYS Feb. 14, 1961 — W. S. CAHILL — 2,971,247
DISC RASP Filed July 15, 1959 — 2 Sheets-Sheet 2

INVENTOR,
William S. Cahill,

BY Bailey, Stephens & Huettig

ATTORNEYS

United States Patent Office 2,971,247
Patented Feb. 14, 1961

2,971,247

DISC RASP

William S. Cahill, Danville, Va., assignor to Cahill Manufacturing Co., Inc., Danville, Va., a corporation of Virginia Filed July 15, 1959, Ser. No. 827,398

2 Claims. (Cl. 29—79)

This invention relates to a rasp for a tire retreading machine. In particular, the invention is directed to a disc rasp for buffing the surface of an old tire to which a new tread is to be applied.

In the patent to Neilsen No. 2,535,088, a rasp is shown in which prongs are mounted on the periphery of a buffing wheel. These prongs are formed on the edges of steel strips, and the strips are mounted on the circumference of the wheel in longitudinal alignment with the axis of the wheel. Each strip is about three inches long and contains nine prongs on each longitudinal edge of the strip. The prongs on the same side of the strip are spaced by a distance of about 5/16" from center to center and the prongs on the opposite edge of the strip are staggered with respect to the prongs on the other side, with the prongs on one side being offset from the prongs on the other side of the strip a distance equal to about one-fifth of the distance between adjacent prongs on the other edge of the strip. According to Patent No. 2,535,088, this results in the leading edge of each strip digging in to cut the tire being buffed while the prongs on the trailing edge present flat faces and lean away from the tire.

The object of this invention is to produce a disc mounting for the prongs by means of which improved results are obtained.

In general, these objects are accomplished by mounting the pronged strips of Patent No. 2,535,088 on the flat surface of a circular disc, rather than on the circumference of a wheel. Furthermore, the strips are inclined 50° with respect to the radii of the disc. By so mounting the strips, the prongs improve the buffing of the surface of the tire, while at the same time the prongs wear longer than when used as disclosed in Patent No. 2,535,088.

The means by which the objects of the invention are obtained are disclosed more fully with reference to the accompanying drawings, in which:

Figure 1 is a perspective view of the pronged strip according to Patent No. 2,535,088;

Figure 5 is a side elevational view showing the pronged strips mounted according to this invention;

Figure 6 is an enlarged cross-sectional view taken on the line 6—6 of Figure 5;

As shown in Figure 1, the strip 2 is as disclosed in Patent No. 2,535,088. This strip has a row of nine prongs, four bent out along one edge of the strip and a similar row of nine prongs, six bent out on the opposite edge of the strip, the strip being about three inches long. The prongs on the same side are spaced a distance of about 5/16" and the prongs on one edge are staggered with respect to the prongs on the opposite edge by being offset a distance equal to about one-fifth of the distance between adjacent prongs on the same edge of strip 2. According to Patent No. 2,535,088, each of the prongs has an outer beveled cutting or chiseling edge 4a and 6a, respectively, and an inner flat surface 4b and 6b, respectively.

Figure 2:
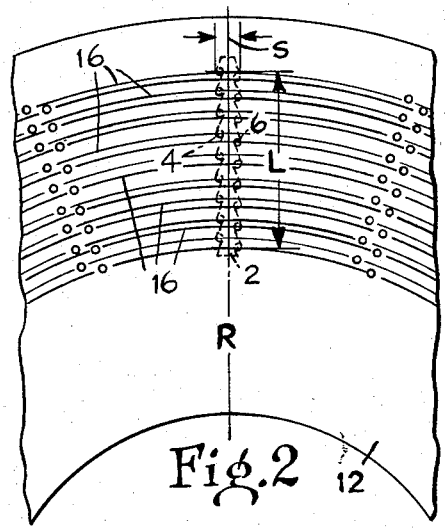
Figure 2 is a side elevational view of a portion of a disc showing the strips of Figure 1 mounted in alignment with the radii of the disc.
Figure 4:
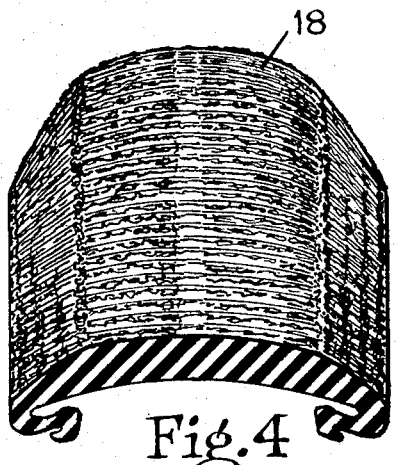
Figure 4 is a view of a portion of a tire showing the surface as buffed by the disc of Figure 2.

Following the teachings of Patent No. 2,535,088, these prongs are mounted on the flat surface of a circular disc 10, note Figure 6, rather than on the circumference of a wheel, by inserting the prongs through the perforations of plate 12 and fastening this plate to the disc 10 by means of bolts 14. The logical way of mounting these strips 2 is to align each strip with the radii of disc 10, as illustrated in Figure 2. In so being mounted, the discs function as described in Patent No. 2,535,088 in that the prongs on the leading edge of the strip, depending upon which way the disc 10 is being rotated, present their cutting edges to the work and lean into it to cut, while the prongs on the trailing edge of the strip 2 present their flat faces 4b to the work and lean away from it so that the trailing edges are buffed by the work. The spacing of the prongs produce alternate wide and narrow lines 16 of chiseling and scraping from the cutting edges 4a and the flat surfaces 4b, respectively, and produce a relatively buffed surface 18 as shown in Figure 4. Moreover, each strip 2 is supported on disc 10 only across the width of the strip with respect to the direction of the rotation of the disc, and this narrow supporting distance permits each strip to rock as the prongs lean into the work, such rocking action destroys the proper angle of contact between the prongs and the tire and results in the rigid wearing of the prongs as well as the bruising rather than the cutting of the surface of the tire being buffed.

Figure 7:
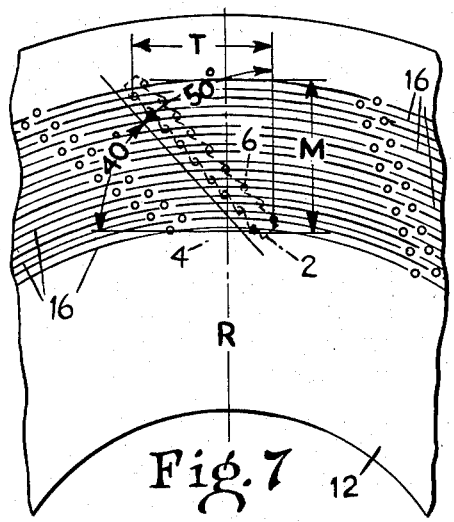
Figure 7 is a front view of a portion of the disc of this invention showing the field of cut as compared to Figure 2.
Figure 8:
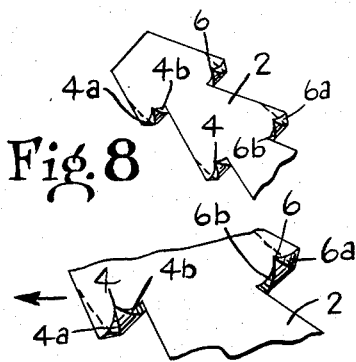
Figure 8 is a view of a portion of a pronged strip showing the presentation of the cutting edges according to this invention.
Figure 8A:
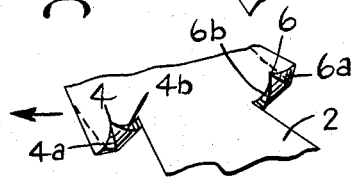
Figure 8a is an enlarged detail of Figure 8.
Figures 3, 3A:
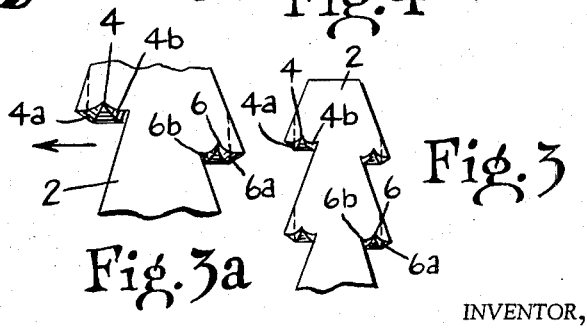
Figure 3 is a top perspective view of a portion of a strip showing the position of the cutting edges as presented in Figure 2.
Figure 3a is an enlarged detail of Figure 3.

According to this invention, as shown in Figures 5, 6 and 7, the strips 2 are inclined at an angle of 50° with respect to the radius R of the disc 10, the strip 2 being held against the surface of the disc by means of the ring-shaped plate 12 secured to the disc by bolts 14. With respect to the tire, the cutting edges 4a are presented to the surface of the tire at the angle as shown in Figures 8 and 8a as compared with Figures 3 and 3a. In so doing, the effective bearing dimension of strip 2 is increased from the width of the strip or the distance S in Figure 2, which amounts to about 3/8", to the distance T of Figure 7, which amounts to about 2½". At the same time, the length of the cutting field on the tire is reduced from the distance L of Figure 2 to the distance M of Figure 7. However, the increased supporting surface T prevents the strip 2 from rocking on the surface of the disc 10 and thus increases the wearing life of the prongs. Again, although the area swept by the prongs is reduced to the dimension M, the change in angle produces a substantially uniform distance between the lines 16 of contact made by the prongs 4 and 6, respectively. Consequently, this invention produces more teeth per inch in Figure 7 than is obtained in Figure 2. As the tire surface to be buffed is round, a wide field usually is not needed, and the smaller field with a greater concentration of prongs means that the prongs will wear evenly along the length of the strip 2 while, when the strip is positioned as shown in Figure 2, the prongs in the center of the strip will wear more quickly than those at the end of strip 2. Furthermore, when the strips are positioned at the 50° angle of this invention, the cutting surfaces 4a or 6a, depending upon the direction of rotation of the disc, cut and scratch away the rubber rather than chiseling and scraping the rubber as occurs in Figures 2 and 4.

Figure 9:
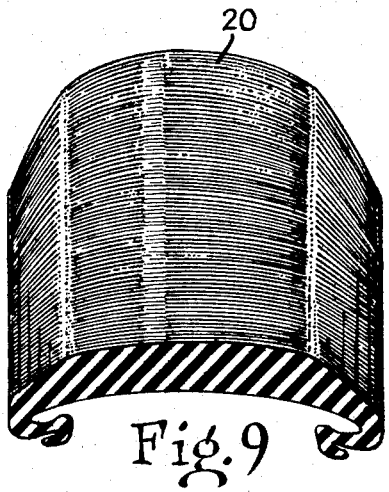
Figure 9 is a view of a portion of a tire showing the surface buffed according to this invention.

The overall advantages thus obtained in the mounting of the prongs of this invention are in that a finer, more velvet-like buff 20, Figure 9, is given the surface of the tire, which ensures a stronger bond between the surface of the tire and the new tread applied thereto. Inasmuch as the strips are held more rigidly against the surface of the disc 10, the prongs have a longer life with more even wearing of the prongs. Less power is consumed in operating the disc in view of the fact that the angle given the cutting edges of the prongs causes the prongs to cut and scratch rather than to chisel and rub or scrape. Also, less heat is built up in the tire as there is less friction due to the rubbing or scraping of the prongs. The cutting edges of the prongs are effective regardless of the direction of rotation of the disc 10.

Having now described the means by which the objects of the invention are obtained, I claim:

1. A disc rasp comprising a flat circular base plate, a plurality of steel strips mounted on said base plate, each strip longitudinally extending at an angle of 50° with respect to the radii of said base plate, each strip having a plurality of equally spaced elongated, sharp-pointed cutting prongs projecting outwardly from said plate and spaced along opposite longitudinal edges of said strip, the prongs along one edge being staggered with respect to the prongs along the other edge, each prong having a sharp cutting edge which extends the full length thereof, the cutting edges of the prongs along one edge of said strip being oppositely facing with respect to the cutting edges of the prongs along the other edge of said strip, each cutting edge facing outwardly of said strip in a direction transversely of the length of said strip, the side face of each prong opposite said cutting edges being flat and positioned inwardly of said strip, said cutting edge of each prong lying along the outer edge of said strip, each prong being curved in a direction outward of said base plate, whereby the prongs positioned along the leading edge of said strip present their cutting edges to the work and cut the work without tilting said strip, and the prongs along the trailing edge of said strip present their flat faces to said work to scratch the work between the lines cut by said cutting edges, and the distance between each cutting and scratching line being substantially equal.

2. A disc rasp as in claim 1, further comprising the prongs on one edge of said strip being offset from the prongs on the other edge of said strip a distance equal to about one-fifth of the distance between adjacent prongs on the same edge of said strip.

References Cited in the file of this patent

UNITED STATES PATENTS

| 943,102 | Schleicher | Dec. 14, 1909 |
| 2,535,088 | Neilson | Dec. 26, 1950 |
| 2,703,119 | Pullen | Mar. 1, 1955 |

FOREIGN PATENTS

| 152,836 | Great Britain | Oct. 28, 1920 |